United States Patent [19]

Takayama et al.

[11] Patent Number: 4,550,062
[45] Date of Patent: Oct. 29, 1985

[54] MAGNETIC RECORDING MEDIUM

[75] Inventors: Suguru Takayama; Kiyoshi Noguchi; Kouji Kobayashi, all of Tokyo, Japan

[73] Assignee: TDK Corporation, Tokyo, Japan

[21] Appl. No.: 561,521

[22] Filed: Dec. 15, 1983

[30] Foreign Application Priority Data

Dec. 25, 1982 [JP] Japan ................................. 57-234812

[51] Int. Cl.$^4$ .............................................. G11B 5/66
[52] U.S. Cl. .................................... 428/611; 428/632; 428/668; 428/678; 428/928; 360/134
[58] Field of Search ............... 428/611, 678, 668, 928, 428/629, 632, 593; 360/134, 135

[56] References Cited

U.S. PATENT DOCUMENTS

| 4,079,169 | 3/1978 | Nigh et al. | 428/668 |
|---|---|---|---|
| 4,323,629 | 4/1982 | Kunieda et al. | 360/134 |
| 4,371,590 | 2/1983 | Izumi et al. | 360/134 |
| 4,385,098 | 5/1983 | Sugita et al. | 428/639 |
| 4,387,136 | 6/1983 | Saito et al. | 360/135 |
| 4,410,583 | 10/1983 | Hanaoka | 360/135 |
| 4,410,603 | 10/1983 | Yamamori et al. | 428/678 |
| 4,418,126 | 11/1983 | Izumi et al. | 360/134 |
| 4,456,661 | 6/1984 | Yamamoto | 360/134 |
| 4,511,635 | 4/1985 | Nagao et al. | 360/134 |

FOREIGN PATENT DOCUMENTS

| 51702 | 5/1978 | Japan | 360/135 |
|---|---|---|---|
| 14324 | 1/1983 | Japan | 360/134 |
| 17539 | 2/1983 | Japan | 360/134 |

Primary Examiner—L. Dewayne Rutledge
Assistant Examiner—John J. Zimmerman
Attorney, Agent, or Firm—Oblon, Fisher, Spivak, McClelland & Maier

[57] ABSTRACT

A magnetic recording medium which comprises a first layer formed on a substrate and comprising Co; Co and Ni; Co and O; or Co, Ni and O, and a second magnetic layer formed on the first magnetic layer and comprising Co and Cr at a weight ratio of Co/Cr being from 2.5 to 8.

24 Claims, No Drawings

MAGNETIC RECORDING MEDIUM

BACKGROUND OF THE INVENTION

1. Field of the Invention

The present invention relates to a magnetic recording medium, and particularly to a magnetic recording medium having a magnetic layer of a continuous thin film type formed by a so-called oblique vapor deposition.

2. Description of the Prior Art

In order to attain compact winding of video and audio recording tapes, there have been active researches to develop a magnetic recording medium having a magnetic layer of a continuous thin film type.

As a magnetic layer for such a continuous thin film type medium, a vapor deposited magnetic layer composed of e.g. Co, Co-Ni, Co-O or Co-Ni-O is most suitable from a view point of the desired characteristics, which is formed by a so-called oblique vapor deposition method in which the vapor deposition is conducted at a predetermined inclined angle relative to the normal line of the substrate.

However, such a magnetic layer has drawbacks such that it is susceptible to oxidation and its corrosion resistance is poor.

Under the circumstances, there have been proposed various protective layers to be laminated on such a magnetic layer to improve its corrosion resistance.

However, if a protective layer is provided, the electromagnetic conversion characteristics will be impaired, and the output and the S/N ratio will be lowered as a result of an increase of a spacing loss attributable to the protective layer. Further, in some of protective layers, the adhesive strength to the magnetic layer is low and the running friction is great, whereby there is a problem of poor running durability.

A totally satisfactory protective layer has not yet been developed which is capable of providing high corrosion resistance and high output and S/N ratio for a magnetic recording medium having a magnetic layer formed by the above-mentioned oblique vapor deposition.

SUMMARY OF THE INVENTION

Under these circumstances, it is a primary object of the present invention to provide a magnetic recording medium which has high corrosion resistance and is capable of providing a high output and S/N ratio and which has good running durability.

A second object of the present invention is to improve the output and S/N ratio within such a primary object of the invention.

A third object of the present invention is to improve the running durability as well as the output and S/N ratio within the primary object of the invention.

These objects are attained by the following first to third aspects of the invention.

Namely, the first aspect of the invention is to provide a magnetic recording medium which comprises a first layer formed on a substrate and comprising Co; Co and Ni; Co and O; or Co, Ni and O, and a second magnetic layer formed on the first magnetic layer and comprising Co and Cr at a weight ratio of Co/Cr being from 2.5 to 8.

The second aspect of the invention is to provide a magnetic recording medium which comprises a first magnetic layer formed on a substrate and comprising Co and Cr; Co, Ni and Cr; Co, O and Cr; or Co, Ni O and Cr, and a second magnetic layer formed on the first magnetic layer and comprising Co and Cr at a weight ratio of Co/Cr being from 2.5 to 8.

The third aspect of the invention is to provide a magnetic recording medium which comprises a first magnetic layer formed on a substrate and comprising Co; Co and Ni; Co and Cr; Co and O; Co, Ni and Cr; Co, O and Cr; Co, Ni and O; or Co, Ni, O and Cr, and a second magnetic layer formed on the first magnetic layer and comprising Co, Cr and O at a weight ratio of Co/Cr being from 2.5 to 8.

DETAILED DESCRIPTION OF THE PREFERRED EMBODIMENT

Now, the present invention will be described in detail with reference to the preferred embodiments.

The magnetic recording medium of the present invention has a first magnetic layer on a substrate.

The first magnetic layer contains Co as an essential component, and comprises Co, Co+Ni, Co+O or Co+Ni+O.

Namely, the first magnetic layer may be composed of Co alone, or it may be composed of Co and Ni. In the case of Co+Ni, the weight ratio of Co/Ni is preferably at least 1.5.

Further, the first magnetic layer may contain O in addition to Co or Co+Ni. When O is incorporated, better results will be obtained with respect to the electromagnetic conversion characteristics or running durability.

In such a case, the atomic ratio of O/Co (no Ni is contained) or O/(Co+Ni) is preferably at most 0.2, more preferably from 0.01 to 0.1.

When the first magnetic layer contains Cr in addition to Co, Co+Ni, Co+O or Co+Ni+O, still better results are obtainable.

Namely, the electromagnetic conversion characteristics as well as the output and S/N ratio will thereby be improved, and the strength of the layer will also be improved.

In such a case, the weight ratio of Cr/Co (no Ni is contained) or Cr/(Co+Ni) is preferably from 0.001 to 0.1.

In this case, the weight ratio of Cr/Co or Cr/(Co+Ni) is preferably from 0.005 to 0.5, whereby a further improvement will be obtained.

Further, such a first magnetic layer may additionally contain a small amount of other components, particularly transition elements such as Fe, Mn, V, Zr, Nb, Ta, Mo, W, Ti, Cu or Zn.

Such a first magnetic layer is preferably composed of particles having a columnar crystal structure which are inclined relative to the normal line of the principal plane of the substrate, whereby the electromagnetic conversion characteristics will be improved.

In such a case, columnar crystal particles are preferably inclined at an angle of from 20° to 60° relative to the normal line of the principal plane of the substrate.

The columnar crystal particles usually have a length corresponding to the thickness of the first magnetic layer, and their diameter is usually from 50 to 500 A.

Co and optionally added Ni or Cr constitute such columnar crystals. When O is added, O is usually present mainly on the surface of the columnar crystal particles, as bound to the metal.

Such a first magnetic layer is usually formed to have a thickness of from 0.05 to 0.5 μm.

In this case, the first magnetic layer may be formed directly on the substrate or may be formed on a undercoat layer formed on the substrate.

Further, the first magnetic layer is usually formed as a single layer. In some cases, however, it may be formed by laminating a plurality of layers with intermediate layers disposed inbetween.

The first magnetic layer is usually formed by an oblique vapor deposition method.

As the oblique vapor deposition method, a conventional oblique vapor deposition method may be employed. The minimum value of the incident angle relative to the normal line of the substrate is preferably at least 30°.

With respect to the conditions for the vapor deposition and the method for after-treatment, conventional conditions and method may be employed. As effective after-treatment, there are many conventional treating methods for the introduction of O into the magnetic layer.

A second magnetic layer is then formed on the first magnetic layer.

The second magnetic layer comprises Co and Cr. The weight ratio of Co/Cr should be from 0.5 to 8.

Such a magnetic layer is per se known as a thin layer for a so-called vertical magnetization medium. However, there has been no instance where such a magnetic layer is laminated on a Co or Co-Ni type magnetic layer formed by the above-mentioned oblique vapor deposition method.

In such a case, if the weight ratio of Co/Cr is greater than 8, the corrosion resistance such as the moisture resistance or acid resistance, will be deteriorated. On the other hand, if the weight ratio is less than 2.5, the electromagnetic conversion characteristics will be deteriorated, and the output and S/N ratio will be lowered.

When the weight ratio of Co/Cr is from 3 to 6, better results are obtainable in respect of the corrosion resistance such as the moisture resistance or acid resistance and in respect of the electromagnetic conversion characteristics.

The second magnetic layer may preferably contain O in addition to Co and Cr.

When O is incorporated, the corrosion resistance will be improved, and the running durability will be also improved.

In such a case, the atomic ratio of O/(Co+Cr) is preferably at most 0.05, more preferably from 0.005 to 0.02.

Further, the second magnetic layer may contain other additional elements such as other transition metal elements.

The second magnetic layer is preferably composed of particles having a columnar crystal structure which are substantially parallel to the normal line of the principal plane of the substrate, whereby the electromagnetic conversion characteristics and corrosion reistance will be improved. In this case, the longitudinal direction of each particle is preferably at an angle of 0° to 10° relative to the normal line of the principal plane of the substrate.

The particles usually have a length corresponding to the thickness of the second magnetic layer. However, they may not neccessarily be fully grown to have a length equal to the thickness of the second magnetic layer.

Co and Cr are present in the particles, and O is usually present mainly on the surface of the particles.

The second magnetic layer is usually formed to have a thickness of from 0.005 to 0.1 $\mu$m, preferably from 0.01 to 0.05 $\mu$m.

If the thickness is less than 0.005 $\mu$m, no adequate effectiveness of the present invention will be obtained, and if the thickness exceeds 0.1 $\mu$m, the electromagnetic conversion characteristics will be poor for a practical application.

The second magnetic layer is usually formed directly on the first magnetic layer.

The second magnetic layer is usually formed by sputtering or so-called vertical vapor deposition. In this case, the conditions for the formation may be selected from a wide range. Further, it is possible to apply various after-treatments for the introduction of O after the formation of the second magnetic layer.

The substrate to be used is not critical. However, a flexible substrate, particularly a resin type substrate which is made of a resin such as polyester or polyimide, is preferred.

The substrate may have various thickness. Particularly preferred is a thickness of from 5 to 20 $\mu$m.

The RMS value of the height of the surface roughness of the rear surface opposite to the magnetic layer-forming surface of the substrate is preferably at least 0.05 $\mu$m, whereby the electromagnetic conversion characteristics will be improved.

To the magnetic recording medium of the present invention having the above-mentioned construction, a top layer made of various organic and inorganic materials may be formed on the second magnetic layer, as the case requires.

The magnetic recording medium of the present invention is useful as a magnetic recording medium for video or audio recording tapes.

The magnetic recording medium according to the present invention has extremely high corrosion resistance such as acid resistance or moisture resistance.

The electromagnetic conversion characteristics are improved over the magnetic recording medium having a single magnetic layer, and by virtue of the second magnetic layer, the output and S/N ratio are improved.

The running friction is low, and the running durability is high.

According to the second aspect of the present invention, the output and S/N ratio are further improved.

Further, according to the third aspect of the invention, the electromagnetic conversion characteristics and the running durability are further improved.

Now, the present invention will be described in further detail with reference to Examples. However, it should be understood that the present invention is by no means restricted by these specific Examples.

EXAMPLE 1

A first magnetic layer having a thickness of 0.1 $\mu$m was formed on a polyethyleneterephthalate (PET) film having a thickness of 10 $\mu$m by an oblique vapor deposition method with use of an alloy having a weight ratio of Co/Ni being 4. In the oblique vapor deposition method, the incident angle was 50° and the vapor deposition atmosphere was such that $P_{Ar}=2\times 10^{-2}$ Pa, and $P_{O_2}=1\times 10^{-2}$ Pa.

In the first magnetic layer thus obtained, Co/Ni=4 (weight ratio), O/(Co+Ni)=0.01 (atomic ratio). The first magnetic layer was composed of columnar crystal partaicles fully grown to the thickness of the first layer at an angle of about 40° relative to the normal line of the principal plane of the substrate and having a diameter of about 0.01 μm. Further, from the Auger spectroscopic analysis under ion milling, the first magnetic layer was found to have a profile such that Co was less in the vicinity of the surface, and the signal attributable to O showed a chemical shift and O was concentrated in the vicinity of the surface. O was found to be present on the surface of the columnar particles in such a form as bound to the metal.

The Sample thus obtained is designated as A0.

Then, a second magnetic layer was formed on the first magnetic layer of A0 by RF sputtering using Co-Cr as the target, whereby Sample A1 was obtained. The sputtering was conducted in an atmosphere such that $P_{Ar}=2\times 10^{-1}$ Pa. The second magnetic layer thus obtained had a thickness of 0.05 μm, and the weight ratio of Co/Cr was 4.5. The second magnetic layer was composed of substantially vertically arranged columnar particles having a length of 0.05 μm and a diameter of about 0.02 μm.

Separately, a second magnetic layer of Co-Cr-O having a similar crystal structure with Co/Cr=4.5 (weight ratio) and O/(Co+Cr)=0.02 (atomic ratio) was formed on the first magnetic layer A0 in the same manner as above except that the sputtering atmosphere in the case of the above A1 was changed to $P_{Ar}=1\times 10^{-2}$ Pa and $P_{O2}=1\times 10^{-2}$ Pa, whereby Sample A2 was obtained.

With respect to the Samples A0, A1 and A2 thus prepared, the following measurements were conducted.

(1) Corrosion resistance

Each Sample was left to stand under relative humidity of 90% for seven days, whereupon the change of the magnetic flux Δϕm per 1 cm² of the Sample was measured ($H_{max}$=5000 Oe) by a vibrating sample maganetometer (VSM).

(2) Electromagnetic conversion characteristics

By using a commercially available video tape as the standard, the record reproduction characteristics (output, noise and S/N ratio) at 4.5 MHz were measured. In this case, as the head, a ferrite head with a gap of 0.3 μm was employed.

(3) Running durability

A 100 pass test (i.e. a test in which the running of a tape was repeated 100 times) was conducted, whereupon the decrease of the output at 4.5 MHz was measured.

The results thereby obtained are shown in Table 1.

TABLE 1

| Samples | A 0 | A 1 | A 2 |
| --- | --- | --- | --- |
| Δϕm (%) | −20 | −9 | −6 |
| 4.5 MHz | | | |
| Output (dB) | +13 | +15 | +14 |
| Noise (dB) | +2 | +2 | +2 |
| S/N (dB) | +11 | +13 | +12 |
| After 100 pass Output (dB) | −5 | −2 | −1 |

From the results shown in Table 1, the effectiveness of the first and third aspects of the present invention is evident.

EXAMPLE 2

A first magnetic layer having a thickness of 0.15 μm was formed on PET having a thickness of 12 μm by an oblique vapor deposition method with use of an alloy having Co/Ni=2.3 (weight ratio) at an incident angle of 45° relative to the normal line of the principal plane of the substrate in an atmosphere of $P_{Ar}=2\times 10^{-2}$ Pa and $P_{O2}=2\times 10^{-2}$ Pa.

In the first magnetic layer thus obtained, Co/Ni=2.3 (weight ratio) and O/(Co+Ni)=0.02 (atomic ratio). The first magnetic layer was composed of columnar crystal particles which were fully grown to the thickness of the first magnetic layer at an angle of about 35° relative to the normal line of the substarate and having a diameter of 0.01 μm. Co and Ni were present in the particles and O was present mainly on the surface of the particles. This Sample was designated as B0.

Then, a second magnetic layer of Co-Cr having a thickness of 0.03 μm was formed on the first magnetic layer B0 by RF sputtering in a atmosphere of $P_{Ar}=2\times 10^{-1}$ Pa using various Co-Cr as the target. Thus, Samples B1 to B6 were obtained. The weight ratio of Co/Cr in each of Samples B1 to B6 is shown in Table 2.

The characteristics of the Samples B1 to B6 are shown in Table 2.

TABLE 2

| | Co/Cr (Weight ratio) | Δ ϕ m (%) | 4.5 MHz S/N ratio | After 100 pass Output decrease (dB) |
| --- | --- | --- | --- | --- |
| B 0 | — | 18 | +13 | 5 |
| B 1 | 9 | 10 | +12 | 3 |
| B 2 | 5.7 | 9 | +14 | 2 |
| B 3 | 4 | 8 | +15 | 2 |
| B 4 | 3 | 7 | +14 | 1 |
| B 5 | 2 | 7 | +13 | 1 |

From the results shown in Table 2, it is evident that the weight ratio of Co/Cr must be from 2.5 to 8.

EXAMPLE 3

A first magnetic layer having a thickness of 0.2 μm was formed on PET having a thickness of 12 μm by an oblique vapor deposition method at an incident angle of 45° relative to the normal line of the principal plane of the substrate in an atmosphere of $P_{Ar}=2\times 10^{-2}$ Pa and $P_{O2}=1\times 10^{-2}$ Pa using three different Co-Ni-Cr alloys.

The compositions of the first magnetic layers of Samples C0, D0 and E0 thus obtained, were as shown in Table 3, and they had substantially the same structure as the first magnetic layer of Example 2. The atomic ratio of O/(Co+Cr+Ni) was 0.01. A second magnetic layer of Co-Cr [Co/Cr=5.7 (weight ratio) and O/(Co+Cr)=0.01 (atmic ratio)] having a thickness of 0.03 μm was formed on each of the first magnetic layers C0, D0 and E0 by vertical vapor deposition in an atmosphere of $P_{Ar}=2\times 10^{-2}$ Pa and $P_{O2}=0.5\times 10^{-2}$ Pa using Co-Cr as the target. Thus, Samples C1, D1 and E1 were obtained.

The characteristics of these Samples are shown in Table 3.

TABLE 3

| Samples | First magnetic layer | | | Second magnetic layer | Δϕm (%) | 4.5 MHz S/N ratio |
| --- | --- | --- | --- | --- | --- | --- |
| | Co | Ni | Cr | | | |
| C 0 | 79 | 20 | 1 | absent | 19 | +14 |
| C 1 | 79 | 20 | 1 | present | 6 | +16 |
| D 0 | 85 | 10 | 5 | absent | 16 | +16 |
| D 1 | 85 | 10 | 5 | present | 4 | +18 |
| E 0 | 85 | 5 | 10 | absent | 12 | +15 |
| E 1 | 85 | 5 | 10 | present | 3 | +17 |

From the results shown in Table 3, the effectiveness of the present invention is evident.

EXAMPLE 4

A first magnetic layer having a thickness of 0.2 μm and O/Co=0.05 was formed by an oblique vapor deposition method using Co under the same conditions as in Example 2, whereby Sample F0 was obtained.

The structure of the first magnetic layer was substantially the same as that of Sample B0.

A second magnetic layer having a thickness of 0.02 μm and Co/Cr=4.9 and O/(Co+Cr)=0.02 was formed on the first magnetic layer F0 by RF sputtering in an atmosphere of $P_{Ar}=1\times10^{-1}$ Pa and $P_{O2}=1\times10^{-1}$ Pa using Co/Cr as the target, whereby Sample F1 was obtained.

The characteristics of these Samples are shown in

TABLE 4

| Samples | F 0 | F 1 |
|---|---|---|
| Δφm (%) | 25 | 10 |
| 4 MHz S/N ratio (dB) | +13 | +15 |

From the results shown in Table 4, the effectiveness of the present invention is evident.

What is claimed is:

1. A magnetic recording medium which comprises a first layer formed on a substrate and comprising Co; Co and Ni; Co and O; or Co, Ni and O, and a second magnetic layer formed on the first magnetic layer and comprising Co and Cr at a weight ratio of Co/Cr being from 2.5 to 8.

2. The magnetic recording medium according to claim 1, wherein the first magnetic layer contains Ni and the weight ratio of Co/Ni is at least 1.5.

3. The magnetic recording medium according to claim 1, wherein the first magnetic layer contains O, and the atomic ratio of O/(Co or Co+Ni) is at most 0.2.

4. The magnetic recording medium according to claim 1, wherein the first magnetic layer is composed of columnar crystal particles which are inclined relative to the normal line of the substrate.

5. The magnetic recording medium according to claim 1, wherein the first magnetic layer has a thickness of from 0.05 to 0.5 μm.

6. The magnetic recording medium according to claim 1, wherein the second magnetic layer has a thickness of from 0.005 to 0.1 μm.

7. The magnetic recording medium according to claim 1, wherein the second magnetic layer is composed of columnar crystal particles which are substantially parallel to the normal line of the substrate.

8. A magnetic recording medium which comprises a first magnetic layer formed on a substrate and comprising Co and Cr; Co, Ni and Cr; Co, O and Cr; or Co, Ni, O and Cr, and a second magnetic layer formed on the first magnetic layer and comprising Co and Cr at a weight ratio of Co/Cr being from 2.5 to 8.

9. The magnetic recording medium according to claim 8, wherein the weight ratio of Cr/(Co or Co+Ni) in the first magnetic layer is from 0.001 to 0.1.

10. The magnetic recording medium according to claim 8, wherein the first magnetic layer contains Ni, and the weight ratio of Co/Ni is at least 1.5.

11. The magnetic recording medium according to claim 8, wherein the first magnetic layer contains O, and the atomic ratio of O/(Co or Co+Ni) is at most 0.2.

12. The magnetic recording medium according to claim 8, wherein the first magnetic layer is composed of columnar crystal particles which are inclined relative to the normal line of the substrate.

13. The magnetic recording medium according to claim 8, wherein the first magnetic layer has a thickness of from 0.05 to 0.5 μm.

14. The magnetic recording medium according to claim 8, wherein the second magnetic layer has a thickness of from 0.005 to 0.1 μm.

15. The magnetic recording medium according to claim 8, wherein the second magnetic layer is composed of columnar crystal particles which are substantially parallel to the normal line of the substrate.

16. A magnetic recording medium which comprises a first magnetic layer formed on a substrate and comprising Co; Co and Ni; Co and Cr; Co and O; Co, Ni and Cr; Co, O and Cr; Co, Ni and O; or Co, Ni, O and Cr, and a second magnetic layer formed on the first magnetic layer and comprising Co, Cr and O at a weight ratio of Co/Cr being from 2.5 to 8.

17. The magnetic recording medium according to claim 16, wherein the first magnetic layer contains Ni, and the weight ratio of Co/Ni is at least 1.5.

18. The magnetic recording medium according to claim 16, wherein the first magentic layer contains O, and the atomic ratio of O/(Co or Co+Ni) is at most 0.2.

19. The magnetic recording medium according claim 16, wherein the first magnetic layer contains Cr, and the weight ratio of Cr/(Co or Co+Ni) is from 0.001 to 01.

20. The magnetic recording medium according to claim 16, wherein the first magentic layer is composed of columnar crystal particles which are inclined relative to the normal line of the substrate.

21. The magnetic recording medium according to claim 16, wherein the first magnetic layer has a thickness of from 0.05 to 0.5 μm.

22. The magnetic recording medium according to claim 16, wherein the second magnetic layer has a thickness of from 0.005 to 0.1 μm.

23. The magnetic recording medium according to claim 16, wherein the atomic ratio of O/(Co+Cr) in the second magnetic layer is at most 0.05.

24. The magnetic recording medium according to claim 16, wherein the second magnetic layer is composed of columnar crystal particles which are substantially parallel to the normal line of the substrate.

* * * * *